Aug. 3, 1943.  E. G. SCHMIDT ET AL  2,325,802
VALVE
Filed Dec. 22, 1941   2 Sheets-Sheet 1
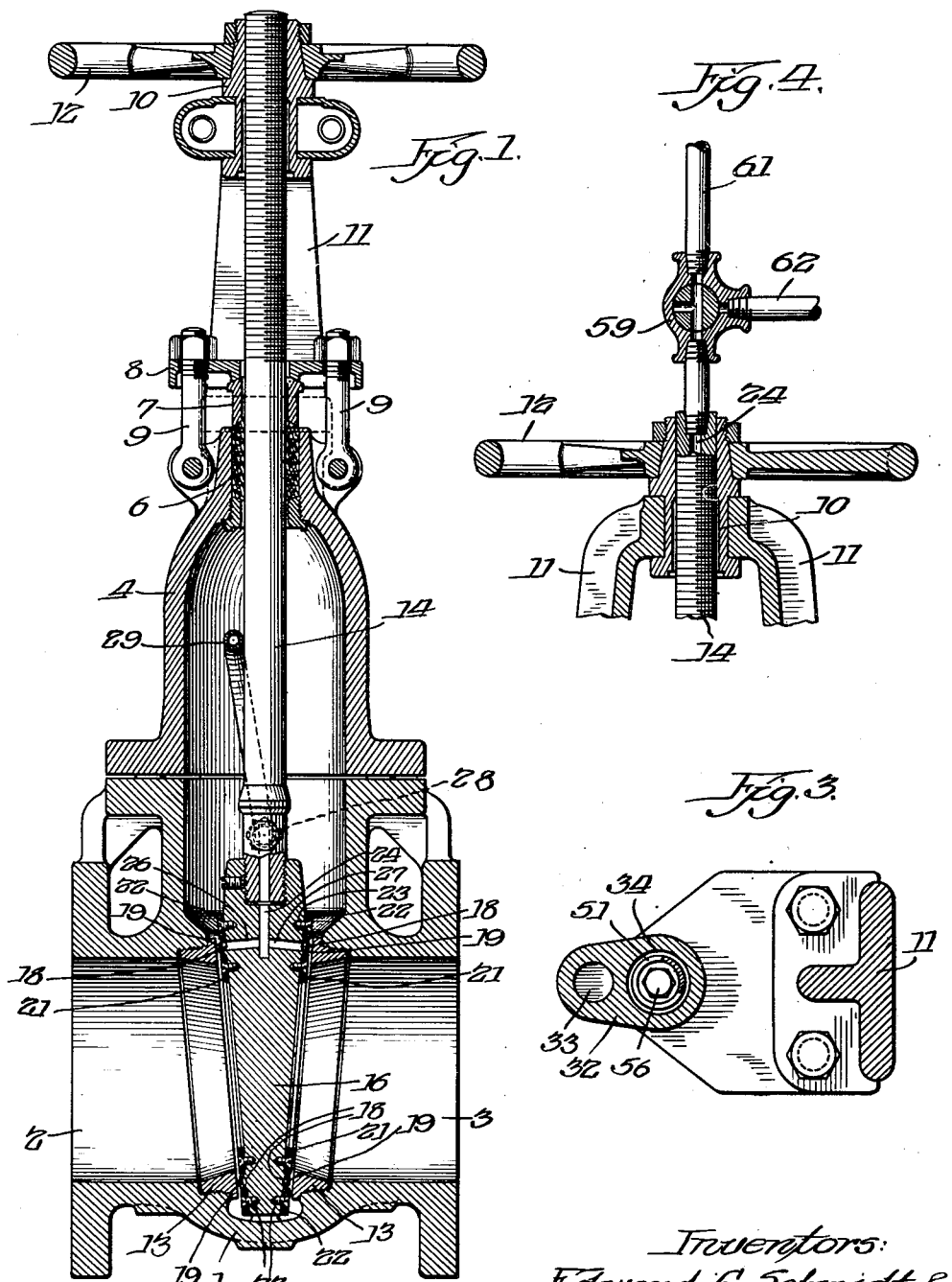
Inventors:
Edward G. Schmidt, &
Chester W. Yant.
By Joseph O. Lange  Atty.

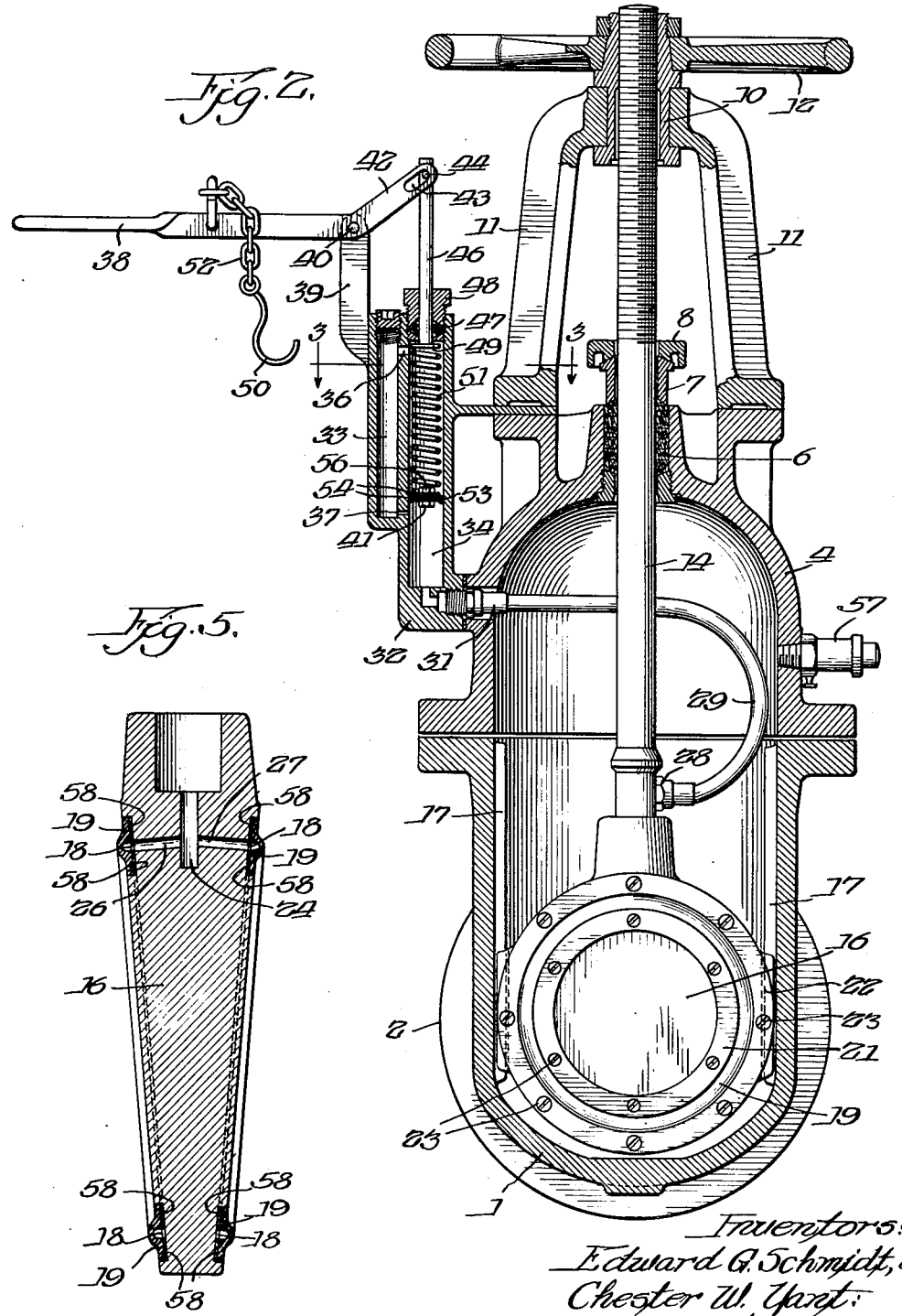

Patented Aug. 3, 1943

2,325,802

UNITED STATES PATENT OFFICE 2,325,802

VALVE

Edward G. Schmidt and Chester W. Yant, Chicago, Ill., assignors to Crane Co., Chicago, Ill., a corporation of Illinois Application December 22, 1941, Serial No. 424,010

6 Claims. (Cl. 251—65)

This invention relates to a new and improved type of gate valve. More particularly, it has for one of its principal objects the provision of a novel gate closure member having flexible expanding faces, whereby a fluid-tight seal at both the inlet and the outlet seat faces of the valve is provided.

An important object of this invention is to provide a valve capable of use on relatively severe service, as for example, in refinery manifold service wherein it is desired to prevent even minute leakage of line fluid through the valve in order that the many varieties of petroleum products confined in separate tanks do not communicate with and thereby contaminate one another. At the present time it is the general rule that conventional gate valves are used on refinery manifold service but, unfortunately, the usual valves employed are not continually tight and therefore a system known as blanking off is frequently used. By "blanking off" is meant the breaking of the outlet connection of the valve and resorting to the installation of a blind flange, and in that way definitely prevent the contamination of one fluid line with another. "Blanking off" is an expensive and undesirable operation and would willingly be dispensed with if operators might receive reasonable assurance that valve leakage can be prevented. It is a general purpose to provide a valve capable of such performance that seat tightness is relatively easily accomplished on severe service.

Another important object of this invention is to provide a valve having a gate closure member with means for expanding its faces whereby the expansion of the faces is accomplished by fluid under pressure in combination with positive means for compensating for changes or variations in the fluid pressure resultant, for example, from temperature changes in the pipe line.

A further important object of this invention is to provide a novel construction in a gate valve which permits the gate or closure member to be reciprocably movable as in the ordinary operation of the valve, without scoring or marring the seat faces of either the valve casing or closure member.

Other and further important objects will become apparent from the disclosures in the following specification and accompanying drawings of a preferred design of wedge gate valve, in which Fig. 1 is a vertical sectional assembly view of a valve embodying this invention.

Fig. 2 is a vertical sectional assembly view of the valve taken at right angles to the view of Fig. 1.

Fig. 3 is a sectional view taken on the line 3—3 of Fig. 2.

Fig. 4 is a sectional view of a modified form of a valve employing this invention.

Fig. 5 is a view of a modified method of attaching the flexible disc faces to the disc closure member.

As shown in the drawings: The reference numeral 1 indicates generally the body or casing of a valve having respective inlet and outlet ports 2 and 3, which is equipped with the usual bonnet 4, the valve stem packing 6, the packing gland 7, the gland flange follower 8 supported and held adjustably by the bolts 9, the yoke arm 11, the handwheel 12 and its customary appurtenances such as the yoke sleeve 10. The body or casing portion of the valve is equipped with removable body seat rings 13 or, if it is desired, the seat of the valve may be cast integrally with the body 1. A stem 14 extends between the yoke sleeve 10 and the gate closure member 16.

As best shown in Fig. 2, the gate 16 is guided in the body of the valve by the usual guide ribs 17 which tend to maintain the gate 16 in substantial alignment. If these guides 17 were not provided the disc 16 would be forced against the downstream seat by the flow of fluid and thereby cause a galling, scratching or tearing of seating surfaces when the disc is raised or lowered. The gate disc 16 is provided with a groove 18 around the periphery of each face over which annularly formed disc faces 19 of rubber or other suitable material are attached. The disc faces 19 are preferably fastened, as shown in Figs. 1 and 2, to the disc 16 by means of two metal rings 21 and 22 which are held to the disc 16 by a plurality of machine screws 23 positioned at intervals peripherally around the face of the disc. This is a preferred method of attachment, although various other methods may be employed such as simply cementing the rubber to the metallic disc as shown in Fig. 5 wherein the annular applications of cement are shown at 58 between the rubber faces 19 and the disc 16. The peripheral grooves 18 communicate with each other and with a central bore 24 through the passages 26 and 27. This central bore 24 extends upwardly and in the preferred form shown enters into the stem 14 and at a point 28 it communicates with a flexible tubing 29. It is foreseeable that the tubing 29 may be attached directly to the disc instead of to the stem as shown and thereby eliminate the bore in the stem. The other end of the flexible tubing or hose 29 is preferably affixed to the yoke bonnet 4 at 31.

As best shown in Figs. 2 and 3, a cylinder body 32 consisting of two parts preferably made integral is mounted externally of the yoke bonnet 4. One part is an expansion chamber and reservoir 33 and the other part the main cylinder 34. As indicated, the chamber 33 and cylinder 34 are interconnected by the passages 36 and 37 at their upper and lower ends, respectively. The purpose of the chamber 33 is to act as storage space for the fluid used in the cylinder 34. The cylinder 34 is preferably pressure filled manually by means of the lever 38 which pivots on the cylinder yoke 39, although obviously any suitable means for creating internal pressure therewithin may be used. The lever 38 pivoted on the pin 40 extending across the yoke 39 is located so that when the handle is in the vertical position the piston 41 is lowered and the fluid is forced downwardly through the flexible hose 29, then through the stem and closure bore 24 and subsequently out through the passages 26 and 27 to the peripheral grooves 18 whereupon the fluid acts against the rubber faces 19, expanding the latter members so as to contact the seats 13. The lever 38 is of the type known as the bent lever wherein the arm extending from the pivot point 40 is bent at an angle upwardly as shown at 42. This extension arm 42 is provided with a slot 43 through which the pin 44 fixedly positioned in the piston rod 46 is movable. The upper end of the cylinder 34 is equipped with packing 47 and a screwed gland 48. The piston rod 46 has an enlarged lower end 49 in the form of and functioning as a plunger. A spring 51 is placed between the plunger 49 and the piston 41 and each of the latter elements is fastened to the said spring 51 at its opposed ends. When the lever 38 is in a vertical position the hook or other clasping element 50 of the chain 52 is snapped over the handwheel 12 to thereby lock the latter against rotation. This arrangement prevents the operation of the valve with the seating faces expanded and also maintains the load on the piston, preventing the release of the cylinder pressure. When the valve is to be opened the lever hook 50 is released from the handwheel and the lever handle 38 is brought down to the horizontal position as shown in Fig. 2. In this position the pressure within the pump chamber has been relieved and the disc seating faces have receded or withdrawn, allowing the gate closure 16 to be raised in the body 1 along the guides 17 without rubbing the disc faces against the seat rings 13. The piston 41 consists of a flexible material such as a synthetic rubber or leather cup 53, stiffener plates 54 on each side of the cup base and a stud or bolt 56 or other suitable means for holding these elements together.

In a device of this type it may be desirable to employ a telltale valve 57 which is a controllable vent or sampling valve positioned in the bonnet or upper portion of the casing to enable the operator to determine the valve tightness or leakage past the valve seats after inflation. Thus it is easy to determine whether sufficient pressure has been applied to the inflatable covers 19 to insure valve tightness.

In operation, the valve is closed by rotating the handwheel 12 thus forcing the gate closure 16 to its seated position. Unlike conventional gate valves, the herein described device is not immediately tight because the guide ribs 17 guide the closure sufficiently closely and therefore do not permit line pressure to force the closure against the outlet seat ring 13. Therefore, in order that the valve be rendered tight it is necessary to expand the rubber faces 19 until they form a fluid-tight seal with the body seat rings 13. The bent lever 38—42 is moved upwardly pivoting around the cylinder yoke pin 40 and forcing the piston rod 46 and its plunger head 49 downwardly. This operation in turn forces the spring 51 and the piston 41 likewise downwardly. When the cup-shaped piston 41 proceeds past the passage 37 pressure is built up below the piston 41 in the cylinder 34, thus forcing the fluid in the cylinder 34 to proceed to the peripheral groove 18 and so expand the rubber faces 19. It is thus evident that the pressure built up below the piston cup 41 will increase as the lever arm 38 is moved upwardly. This causes a compression of the spring 51, thereby exerting a constant spring load on the piston to maintain pressure against the disc faces. Upon changes of temperature whereby the fluid expands or contracts the piston is free to lift or to drop accordingly and maintain a constant pressure for the purpose heretofore described. The operator after closing the valve and inflating the disc faces should preferably open the telltale valve 57 and if fluid escapes he will then know that the valve is not tight and that therefore higher pressure should be applied to the expansible disc faces. It is obvious that this telltale valve 57 should be closed before the main valve is again opened in order that no leakage will occur therethrough.

The flexible tubing 29 may be made of synthetic rubber or any other suitable material. This tubing 29 is so located that it does not interfere with raising or lowering of the gate 16.

As shown in Fig. 4, the modified construction discloses that the bore or vertical passage 24 extends the entire length of the stem 14 where it connects to a three-way valve 59 which has other connections respectively to an auxiliary pressure line 61 and a discharge 62 to an auxiliary line sump. With this structure the manual means of inflating the disc faces is eliminated in favor of using an existing air pressure line. The air pressure line may of course be similarly attached to the side of the valve where the manual means of inflating is now connected in the drawings first described.

The valve is easy to operate and effects a substantial saving in time and labor in eliminating the blanking off of the line as it is now done. The chain and hook 52 perform an additional function aside from that of holding the lever 38 in an upward position. This additional function prevents rotation of the handwheel without first removing the hook 52 and so preliminarily assures a deflation of the rubber faces before the disc is raised. Inasmuch as the faces of the valve cannot be scored due to the deflation of the faces and also the guides in the disc and the body, the life of the valve will be increased considerably.

It is apparent that numerous details of construction may be varied throughout a wide range without departing from the principles described herein, and as defined by the claims appended hereto interpreted in light of the prior art.

We claim:

1. A gate valve comprising a casing, a gate closure mounted within the said casing, a stem therefor, guides within the casing for the said gate closure whereby transverse movement of the gate closure is substantially restrained, the said gate closure having peripheral grooves in each of its faces and a central bore, a flexible cover for each closure face annularly attached to the said closure member, means for supplying fluid under pressure within the peripheral grooves of the gate closure whereby inflation of each of the flexible covers is effected, the said gate closure having communicating passageways from each of said peripheral grooves to said central bore, the said stem having a central passage in communication with a passage in the said gate closure, the said means for supplying fluid under pressure comprising a pump adjacent the said valve, including flexible tubing movable with the said gate closure, the said pump comprising a fluid storage chamber and an adjacent cylinder having passageways interconnecting the chamber and the cylinder.

2. A gate valve comprising a casing, a gate closure mounted within the said casing, guide means within the casing for the gate closure whereby transverse movement of the gate closure is substantially restrained, the said gate closure having recessed portions in each face, a flexible cover for each closure face attached to the said closure member, means for supplying a fluid under pressure to the said recessed portions of the gate closure whereby simultaneous inflation of each of the flexible covers is effected, the said gate closure member having communicating passageways from each of said recessed portions to a central bore therewithin, the said means for supplying fluid under pressure comprising a pump and flexible conduit, whereby the said pump communicates with a passage within the said gate closure, locking means associated with the said pump and said valve whereby pressure may be maintained within the said pump and operation of said valve inhibited when said locking means engage the said valve.

3. A gate valve comprising a casing, a seat in the said casing, a gate closure member mounted within the said casing, guides within the casing for the gate closure whereby non-vertical movement of the said gate closure is restrained, the said gate closure having grooves in each of its faces adjacent their peripheries, a flexible fluid-tight cover positioned over the groove in each gate face, means for forcing a fluid under pressure to each flexible member, whereby the resultant inflation of the flexible members creates a fluid-tight seal between the gate closure member and the seat in the said casing, the said flexible members being joined by a passageway through the said gate, a flexible tubing connected at one end to the said passageway in the said gate and at the other end to the means for forcing a fluid under pressure.

4. A gate valve comprising a casing, a seat in the said casing, a gate closure member mounted within the said casing, guides within the casing for the gate closure whereby non-vertical movement of the said gate closure is restrained, the said gate closure having grooves in each of its faces adjacent their peripheries, a flexible fluid-tight cover positioned over the groove in each gate face, means for forcing a fluid under pressure to each flexible member, whereby the resultant inflation of the flexible members creates a fluid-tight seal between the gate closure member and the seat in the said casing, the said flexible members being joined by a passageway through the said gate, a flexible tubing connected at one end to the said passageway in the said gate and at the other end to the means for forcing a fluid under pressure, said means comprising an externally positioned pump and fluid storage chamber.

5. A gate valve comprising a casing, a seat in the said casing, a gate closure member mounted within the said casing, guides within the casing for the gate closure whereby non-vertical movement of the said gate closure is restrained, the said gate closure having grooves in each of its faces adjacent their peripheries, a flexible fluid-tight cover positioned over the groove in each gate face, means for forcing a fluid under pressure to each flexible member, whereby the resultant inflation of the flexible members creates a fluid-tight seal between the gate closure member and the seat in the said casing, the said flexible members being joined by a passageway through the said gate, a flexible tubing connected at one end to the said passageway in the said gate and at the other end to the means for forcing a fluid under pressure, said means comprising an externally positioned pump and fluid storage chamber, the said pump having an operating lever, a connecting member fixedly attached to the said operating lever and removably attached to the said handwheel, whereby when the connecting member is attached to the said handwheel the valve is rendered inoperative.

6. A gate valve comprising a casing, a seat in the said casing, a gate closure member mounted within the said casing, guides within the casing for the gate closure whereby non-vertical movement of the said gate closure is restrained, the said gate closure having grooves in each of its faces adjacent their peripheries, a flexible fluid-tight cover positioned over the groove in each gate face, means for forcing a fluid under pressure to each flexible member, whereby the resultant inflation of the flexible members creates a fluid-tight seal between the gate closure member and the seat in the said casing, the said flexible members being joined by a passageway through the said gate, a flexible tubing connected at one end to the said passageway in the said gate and at the other end to the means for forcing the fluid under pressure, independent valve means cooperating with the said casing whereby upon opening said independent valve means any leakage past said inflated covers is discernible.

EDWARD G. SCHMIDT.
CHESTER W. YANT.